United States Patent
Reznik et al.

(10) Patent No.: US 11,586,466 B2
(45) Date of Patent: Feb. 21, 2023

(54) CENTRALIZED HIGH-AVAILABILITY FLOWS EXECUTION FRAMEWORK

(71) Applicant: EMC IP Holding Company LLC, Hopkinton, MA (US)

(72) Inventors: Inna Reznik, Tel Aviv (IL); Ahia Lieber, Tel Aviv (IL); Eran Banin, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 121 days.

(21) Appl. No.: 17/153,135

(22) Filed: Jan. 20, 2021

(65) Prior Publication Data

US 2022/0229693 A1 Jul. 21, 2022

(51) Int. Cl.
| | |
|---|---|
| *G06F 9/48* | (2006.01) |
| *G06F 9/50* | (2006.01) |
| *G06F 11/30* | (2006.01) |
| *G06F 9/38* | (2018.01) |

(52) U.S. Cl.
CPC .......... *G06F 9/4881* (2013.01); *G06F 9/3851* (2013.01); *G06F 9/48* (2013.01); *G06F 9/485* (2013.01); *G06F 9/4806* (2013.01); *G06F 9/4843* (2013.01); *G06F 9/50* (2013.01); *G06F 9/5005* (2013.01); *G06F 9/5011* (2013.01); *G06F 11/30* (2013.01); *G06F 2209/5018* (2013.01)

(58) Field of Classification Search
CPC .......... G06F 9/48; G06F 9/485; G06F 9/4881; G06F 9/50; G06F 9/5011; G06F 9/5018; G06F 2209/5018; G06F 9/4806; G06F 9/4843; G06F 9/5005; G06F 11/30
See application file for complete search history.

(56) References Cited

U.S. PATENT DOCUMENTS

| | | | |
|---|---|---|---|
| 10,178,032 B1 | 1/2019 | Freitas | |
| 10,229,017 B1 | 3/2019 | Zou et al. | |
| 10,469,574 B1 | 11/2019 | Dai et al. | |
| 10,664,397 B2 | 5/2020 | Shveidel et al. | |
| 11,151,082 B1 | 10/2021 | Chheda et al. | |
| 2014/0344824 A1* | 11/2014 | Brock | G06F 9/485 718/103 |
| 2016/0269313 A1* | 9/2016 | Brooker | H04L 47/783 |

(Continued)

*Primary Examiner* — Charles M Swift
(74) *Attorney, Agent, or Firm* — BainwoodHuang

(57) ABSTRACT

Techniques for providing a framework for handling execution of HA flows in an active-active storage node configuration. The techniques include receiving notifications of functional statuses of processes and/or equipment associated with storage nodes in the active-active configuration, making determinations regarding how to address HA events occurring on the processes and/or equipment associated with the storage nodes based on the received notifications, and, in response to a request to execute an HA flow for a respective HA event, determining whether to refuse the request to execute the HA flow, service the request to execute the HA flow, abort one or more HA flows in execution, and/or postpone execution of the HA flow to a later time based on one or more dependencies defining conditions for the HA flow. In this way, mutual interference of HA flows or other process threads in the active-active configuration can be reduced or eliminated.

20 Claims, 3 Drawing Sheets

(56) References Cited

U.S. PATENT DOCUMENTS

| | | | |
|---|---|---|---|
| 2016/0277498 A1* | 9/2016 | Kulkarni | H04L 67/10 |
| 2017/0171302 A1* | 6/2017 | Seo | H04L 67/1001 |
| 2017/0228233 A1* | 8/2017 | Mishaeli | G06F 9/485 |
| 2019/0190778 A1* | 6/2019 | Easterling | H04L 67/34 |

* cited by examiner

CENTRALIZED HIGH-AVAILABILITY FLOWS EXECUTION FRAMEWORK

BACKGROUND

In a high-availability (HA) cluster, storage controllers (also referred to herein as "storage nodes") may be deployed in an active-passive configuration, in which a primary storage node takes on the role of an active node and at least one secondary storage node takes on the role of a standby node. In the active-passive configuration, the active node may process storage input/output (IO) requests from host computers and maintain page reference information on its memory, while the standby node may not be currently interacting with the host computers. Storage controllers in an HA cluster may also be deployed in an active-active configuration, in which two or more active nodes collaborate to process storage IO requests from host computers and maintain page reference information on their memories in image style.

SUMMARY

In the event of a process or equipment malfunction (also referred to herein as a "high availability (HA) event") on an active node in an active-passive configuration, a system-level failover can occur, in which tasks of the active node, including processing storage IO requests and maintaining page reference information, are entirely taken over by a standby node. An appropriate set of actions can then be executed in a high-availability (HA) process flow (also referred to herein as an "HA flow") to address actual or potential ramifications of the HA event. However, in an active-active configuration, multiple such HA events can occur simultaneously on two or more active nodes, requiring multiple HA flows to be executed concurrently to address any actual or potential ramifications of the HA events. Because such concurrent HA flows can have dependencies in which certain HA flows are dependent upon other HA flows or processes to execute their functions, a more unified approach to addressing HA events occurring on storage nodes in an active-active configuration is needed.

Techniques are disclosed herein for providing a centralized framework for handling execution of high-availability (HA) process flows in an active-active storage node configuration. The disclosed techniques can include an HA flows execution framework manager (also referred to herein as the "framework manager"), which can be implemented on one of multiple storage nodes in an active-active configuration. In the disclosed techniques, the framework manager can receive, periodically or at intervals, explicit or implicit notifications and/or reports of functional statuses of processes and/or equipment associated with the storage nodes in the active-active configuration. The framework manager can make determinations regarding whether and/or how to address any actual or potential process and/or equipment malfunctions (or "HA events") based on the received notifications and/or reports. If the framework manager determines to address one or more actual or potential HA events occurring in the active-active configuration, then the framework manager can implement an HA flow for each HA event as an asynchronous process thread. The framework manager can represent each HA flow as an instance of an HA flow object and store the HA flow object for each HA flow waiting to be executed in a persistent repository or database. The framework manager can define each HA flow with reference to one or more dependencies specifying its relationships with one or more other HA flows and/or certain software, firmware, and/or hardware modules or components in the active-active configuration. Based at least on the dependencies defining conditions for the HA flow, the framework manager can determine whether to refuse a request to execute the HA flow, service the request to execute the HA flow, abort one or more HA flows in execution, and/or postpone execution of the HA flow to a later time.

By receiving notifications and/or reports of functional statuses of processes and/or equipment associated with storage nodes in an active-active configuration, making determinations regarding whether and/or how to address actual or potential HA events occurring on the processes and/or equipment associated with the storage nodes based on the received notifications and/or reports, and, in response to a request to execute an HA flow for a respective HA event, determining whether to refuse the request to execute the HA flow, service the request to execute the HA flow, abort one or more HA flows in execution, and/or postpone execution of the HA flow to a later time based on one or more dependencies defining conditions for the HA flow, mutual interference of HA flows or other process threads in the active-active configuration can be reduced or eliminated. As a result, recovery times from HA events occurring in the active-active configuration can be reduced.

In certain embodiments, a method of handling execution of high-availability (HA) process threads in an active-active storage node configuration includes receiving notifications of functional statuses of processes or equipment associated with storage nodes in an active-active configuration, determining that an HA event has occurred on one of the processes or equipment associated with the storage nodes in the active-active configuration based on the received notifications, and, in response to a request to execute a first HA process thread to address the HA event, performing one or more of refusing the request to execute the first HA process thread, servicing the request to execute the first HA process thread, aborting one or more HA process threads in execution, and postponing execution of the first HA process thread based on one or more dependencies defining conditions for the first HA process thread.

In certain arrangements, the method further includes specifying a set of parameters and a set of executable steps for the first HA process thread. The set of parameters includes the one or more dependencies defining the conditions for the first HA process thread and an abort policy specifying rules regarding whether or when to abort the one or more HA process threads in execution.

In certain arrangements, the method further includes, in response to the request to execute the first HA process thread not being refused, allocating a first HA process thread object representing the first HA process thread, and adding the first HA process thread object to a persistent database.

In certain arrangements, the method further includes checking the specified rules in the abort policy and aborting one or more of the HA process threads in execution based on the specified rules.

In certain arrangements, the method further includes checking the dependencies defining the conditions for the first HA process thread with regard to one or more other HA process threads represented by other HA process thread objects in the persistent database.

In certain arrangements, the method further includes, in response to the dependencies dictating an order in which the first HA process thread and the other HA process threads are to be executed, performing the postponing of the execution of the first HA process thread to satisfy the dependencies.

In certain arrangements, the method further includes checking the specified rules in the abort policy and aborting all of the HA process threads in execution based on the specified rules.

In certain arrangements, the method further includes checking the dependencies defining the conditions for the first HA process thread with regard to one or more other HA process threads represented by other HA process thread objects in the persistent database, and, in response to the dependencies dictating an order in which the first HA process thread and the other HA process threads are to be executed, performing the postponing of the execution of the first HA process thread to satisfy the dependencies.

In certain arrangements, the method further includes, for each respective HA process thread from among the one or more other HA process threads represented by the other HA process thread objects in the persistent database, determining one or more of whether a request to execute the respective HA process thread should be refused and whether execution of the respective HA process thread should be postponed as necessary to satisfy its dependencies.

In certain arrangements, the method further includes, having determined whether the request to execute the respective HA process thread should be refused or whether the execution of the respective HA process thread should be postponed, initiating execution of the first HA process thread.

In certain embodiments, a system for handling execution of high-availability (HA) process threads in an active-active storage node configuration includes a persistent database, a memory, and processing circuitry configured to execute program instructions out of the memory to receive notifications of functional statuses of processes or equipment associated with storage nodes in an active-active configuration, to determine that an HA event has occurred on one of the processes or equipment associated with the storage nodes in the active-active configuration based on the received notifications, and, in response to a request to execute a first HA process thread to address the HA event, to perform one or more of refusing the request to execute the first HA process thread, servicing the request to execute the first HA process thread, aborting one or more HA process threads in execution, and postponing execution of the first HA process thread based on one or more dependencies defining conditions for the first HA process thread.

In certain arrangements, the processing circuitry is further configured to execute the program instructions out of the memory to specify a set of parameters and a set of executable steps for the first HA process thread, in which the set of parameters includes the one or more dependencies defining the conditions for the first HA process thread and an abort policy specifying rules regarding whether or when to abort the one or more HA process threads in execution.

In certain arrangements, the processing circuitry is further configured to execute the program instructions out of the memory, in response to the request to execute the first HA process thread not being refused, to allocate a first HA process thread object representing the first HA process thread, and to add the first HA process thread object to the persistent database.

In certain arrangements, the processing circuitry is further configured to execute the program instructions out of the memory to check the specified rules in the abort policy, and to abort one or more of the HA process threads in execution based on the specified rules.

In certain arrangements, the processing circuitry is further configured to execute the program instructions out of the memory to check the dependencies defining the conditions for the first HA process thread with regard to one or more other HA process threads represented by other HA process thread objects in the persistent database.

In certain arrangements, the processing circuitry is further configured to execute the program instructions out of the memory, in response to the dependencies dictating an order in which the first HA process thread and the other HA process threads are to be executed, to perform the postponing of the execution of the first HA process thread to satisfy the dependencies.

In certain arrangements, the processing circuitry is further configured to execute the program instructions out of the memory to check the specified rules in the abort policy, to abort all of the HA process threads in execution based on the specified rules, to check the dependencies defining the conditions for the first HA process thread with regard to one or more other HA process threads represented by other HA process thread objects in the persistent database, and, in response to the dependencies dictating an order in which the first HA process thread and the other HA process threads are to be executed, to perform the postponing of the execution of the first HA process thread to satisfy the dependencies.

In certain arrangements, the processing circuitry is further configured to execute the program instructions out of the memory, for each respective HA process thread from among the one or more other HA process threads represented by the other HA process thread objects in the persistent database, to determine one or more of whether a request to execute the respective HA process thread should be refused and whether execution of the respective HA process thread should be postponed as necessary to satisfy its dependencies.

In certain arrangements, the processing circuitry is further configured to execute the program instructions out of the memory, having determined whether the request to execute the respective HA process thread should be refused or whether the execution of the respective HA process thread should be postponed, initiating execution of the first HA process thread.

In certain embodiments, a computer program product includes a set of non-transitory, computer-readable media having instructions that, when executed by processing circuitry, cause the processing circuitry to perform a method of handling execution of high-availability (HA) process threads in an active-active storage node configuration. The method includes receiving notifications of functional statuses of processes or equipment associated with storage nodes in an active-active configuration, determining that an HA event has occurred on one of the processes or equipment associated with the storage nodes in the active-active configuration based on the received notifications, and, in response to a request to execute a first HA process thread to address the HA event, performing one or more of refusing the request to execute the first HA process thread, servicing the request to execute the first HA process thread, aborting one or more HA process threads in execution, and postponing execution of the first HA process thread based on one or more dependencies defining conditions for the first HA process thread.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

FIG. 1b is a block diagram of an active-active storage system in the data storage environment of FIG. 1a;

FIG. 2b is a block diagram of an exemplary HA flow object upon which the techniques can be practiced in the data storage environment of FIG. 1a.

DETAILED DESCRIPTION

Techniques are disclosed herein for providing a centralized framework for handling execution of high-availability (HA) process flows (also referred to herein as "HA flow(s)") in an active-active storage node configuration. The disclosed techniques can include receiving notifications and/or reports of functional statuses of processes and/or equipment associated with storage nodes in an active-active configuration, making determinations regarding whether and/or how to address actual or potential malfunctions (also referred to herein as "HA events") occurring on the processes and/or equipment associated with the storage nodes based on the received notifications and/or reports, and, in response to a request to execute an HA flow for a respective HA event, determining whether to refuse the request to execute the HA flow, service the request to execute the HA flow, abort one or more HA flows in execution, and/or postpone execution of the HA flow to a later time based on one or more dependencies defining conditions for the HA flow. In this way, mutual interference of HA flows or other process threads in an active-active configuration can be reduced or eliminated, and recovery times from HA events occurring in the active-active configuration can be reduced.

Figure 1B:
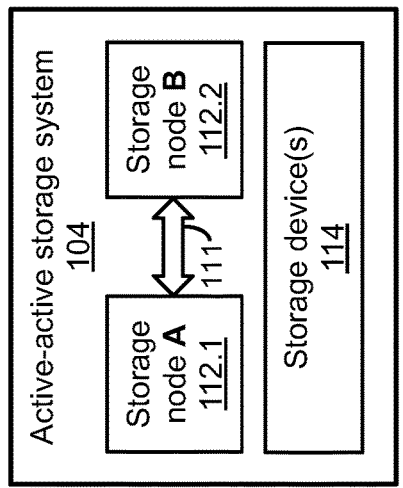
Figure 1A:
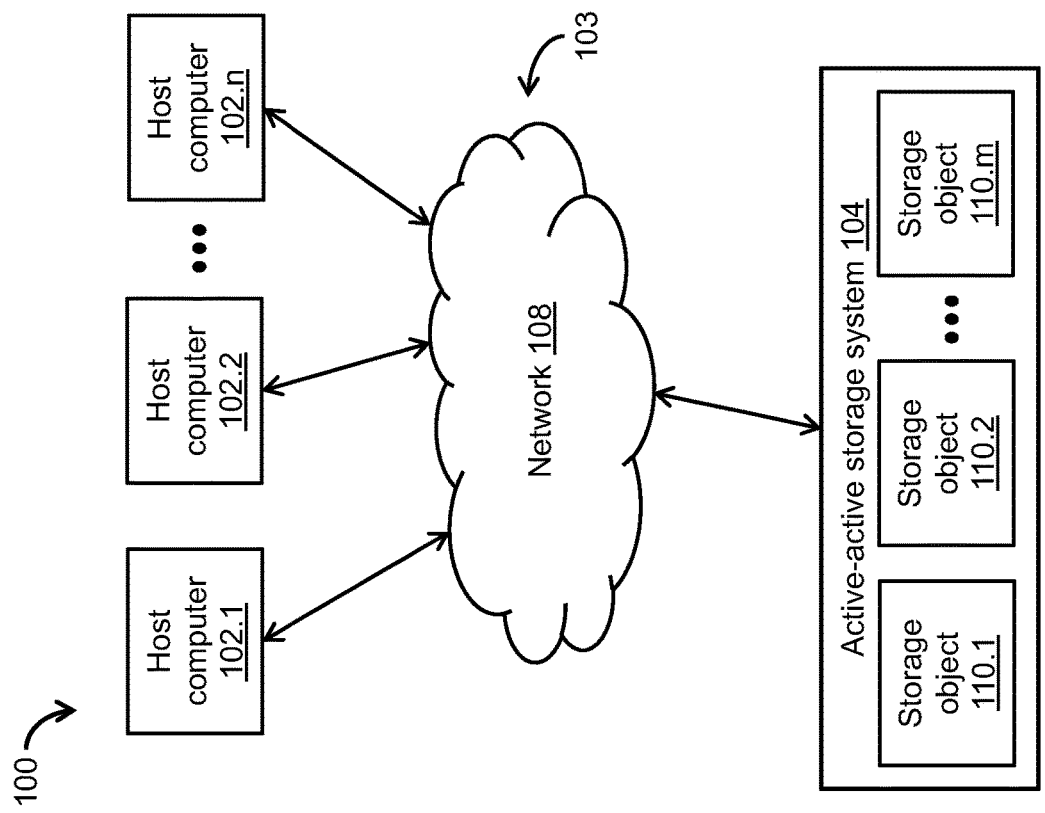
FIG. 1a is a block diagram of an exemplary data storage environment, in which techniques can be practiced for providing a centralized framework for handling execution of high-availability (HA) process flows in an active-active storage node configuration.

FIG. 1a depicts an illustrative embodiment of an exemplary data storage environment 100, in which techniques can be practiced for providing a centralized framework for handling execution of HA flows in an active-active storage node configuration. As shown in FIG. 1a, the data storage environment 100 can include a plurality of host computers 102.1, 102.2, ..., 102.n, an active-active storage system 104, and a communications medium 103 that includes at least one network 108. For example, each of the plurality of host computers 102.1, ..., 102.n can be configured as a web server computer, a file server computer, an email server computer, an enterprise server computer, and/or any other suitable client/server computer or computerized device. The plurality of host computers 102.1, ..., 102.n can be configured to provide, over the network 108, storage input/output (IO) requests (e.g., small computer system interface (SCSI) commands, network file system (NFS) commands) to the active-active storage system 104. Such storage IO requests (e.g., write IO requests, read IO requests) can direct a storage controller (or "storage node") to write or read data blocks, data pages, data files, or any other suitable data elements to/from volumes (VOLs), logical units (LUs), file systems, and/or any other suitable storage objects, such as storage objects 110.1, 110.2, ..., 110.m maintained in association with the active-active storage system 104.

The communications medium 103 can be configured to interconnect the plurality of host computers 102.1, ..., 102.n and the active-active storage system 104 to enable them to communicate and exchange data and/or control signaling. As shown in FIG. 1a, the communications medium 103 can be illustrated as a "cloud" to represent different communications topologies such as a backbone topology, a hub-and-spoke topology, a loop topology, an irregular topology, and so on, or any suitable combination thereof. As such, the communications medium 103 can include copper-based data communications devices and cabling, fiber optic-based communications devices and cabling, wireless communications devices, and so on, or any suitable combination thereof. Further, the communications medium 103 can be configured to support storage area network (SAN) communications, network attached storage (NAS) communications, local area network (LAN) communications, metropolitan area network (MAN) communications, wide area network (WAN) communications, wireless communications, distributed infrastructure communications, and/or any other suitable communications.

FIG. 1b depicts another view of the active-active storage system 104 of FIG. 1a. As employed herein, the term "active-active storage system" refers to a highly available storage system, in which multiple storage nodes have shared or exclusive read-write IO access to the same storage objects (e.g., volumes (VOLs), logical units (LUs), file systems). As shown in FIG. 1b, the active-active storage system 104 can include at least two storage controllers (or "storage nodes") for high availability, namely, a primary storage node A 112.1 and a secondary storage node B 112.2, which is communicably connected to the storage node A 112.1 by a communication path 111. For example, each of the storage node A 112.1 and the storage node B 112.2 can receive storage IO requests from the respective host computers 102.1, ..., 102.n over the network 108. In response to the storage IO requests, the storage nodes A 112.1, B 112.2 can perform storage IO operations (e.g., read-write IO operations) to write/read data blocks, data pages, data files, or any other suitable data elements to/from one or more of the plurality of storage objects 110.1, ..., 110.m. Further, periodically or at intervals, page reference information pertaining to read-write IO operations maintained in a journal by the storage node A 112.1 can be synchronized with corresponding page reference information maintained in a journal by the storage node B 112.2. If the storage node A 112.1 is taken offline (or at any other suitable time), then the storage node B 112.2 can assume the role and/or duties of the storage node A 112.1 with regard to the handling of storage IO requests, providing high availability within the active-active storage system 104. As further shown in FIG. 1b, the active-active storage system 104 can include one or more storage devices 114, which can be embodied as one or more non-volatile random-access memories (NVRAM), solid-state drives (SSDs), hard disk drives (HDDs), flash memories, and/or any other suitable storage device(s) for storing storage object data and/or metadata.

Figure 2B:
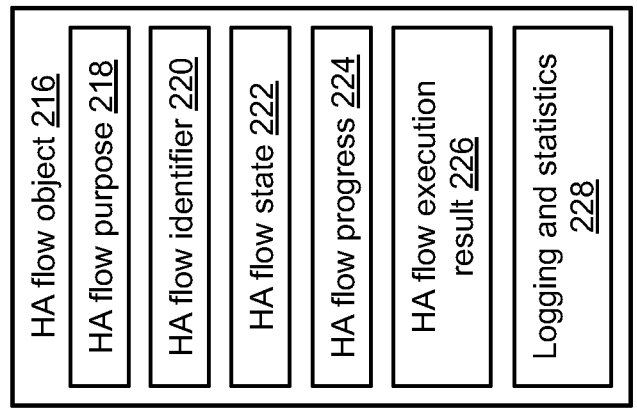
Figure 2A:
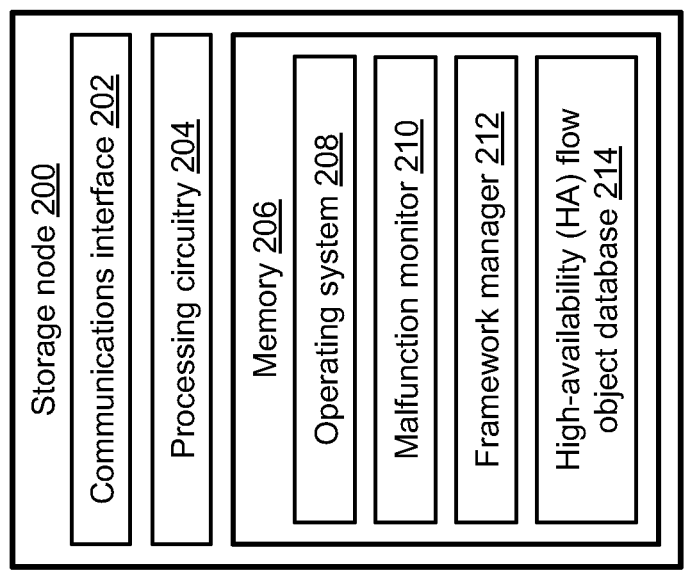
FIG. 2a is a block diagram of an exemplary storage controller (or "storage node") from among multiple storage controllers (or "storage nodes") included in the active-active storage system of FIG. 1b, in which the storage node includes an HA flows execution framework manager (or "framework manager") and a persistent HA flow object database.

FIG. 2a depicts an exemplary storage node 200 from among multiple storage nodes included in the active-active storage system 104 of FIG. 1a. As shown in FIG. 2a, the storage node 200 can include a communications interface 202, processing circuitry 204, and a memory 206. The communications interface 202 can include one or more of an Ethernet interface, an InfiniBand interface, a fiber channel interface, and/or any other suitable communications interface. The communications interface 202 can further include SCSI target adapters, network interface adapters, and/or any other suitable adapters for converting electronic, optical, and/or wireless signals received over the network(s) 108 to a form suitable for use by the processing circuitry 204. The memory 206 can include volatile memory such as random-access memory (RAM) or any other suitable volatile memory, as well as persistent memory such as NVRAM, read-only memory (ROM), one or more HDDs, one or more SSDs, or any other suitable persistent memory. The memory 206 can be configured to store a variety of software constructs realized in the form of specialized code and data (e.g., program instructions) that can be executed by the processing circuitry 204 to carry out the techniques and/or methods disclosed herein. The memory 206 can further include an operating system 208 such as the Linux OS, Unix OS, Windows OS, or any other suitable operating system, as well as a malfunction monitor 210 that can be executed by the processing circuitry 204. The processing circuitry 204 can include one or more physical processors, controllers, IO modules, and/or any other suitable computer hardware or combination thereof.

It is noted that each of the multiple storage nodes (e.g., storage node A 112.1, storage node B 112.2) included in the active-active storage system 104 can be configured to include at least a communications interface, processing circuitry, a memory, an OS, and a malfunction monitor like the storage node 200 of FIG. 2a. In the active-active storage system 104, one of the multiple storage nodes can be further configured to include an HA flows execution framework manager (or "framework manager") 212, as well as a persistent repository or database 214 configured to store multiple instances of high-availability (HA) flow objects. In the disclosed techniques, the malfunction monitor 210 can be configured to monitor functional statuses of processes and/or equipment associated with the storage node 200 and send notifications and/or reports of the functional statuses to the framework manager 212.

In the context of the processing circuitry 204 being implemented using one or more processors executing specialized code and data, a computer program product can be configured to deliver all or a portion of the specialized code and data to the respective processor(s). Such a computer program product can include one or more non-transient computer-readable storage media, such as a magnetic disk, a magnetic tape, a compact disk (CD), a digital versatile disk (DVD), an optical disk, a flash drive, a solid-state drive (SSD), a secure digital (SD) chip or device, an application specific integrated circuit (ASIC), a field programmable gate array (FPGA), and so on. Further, the non-transient computer-readable storage media can be encoded with sets of program instructions for performing, when executed by the respective processor(s), the various techniques and/or methods disclosed herein.

FIG. 2b depicts an exemplary HA flow object 216 that can be stored in the persistent HA flow object database 214 of FIG. 2a. In the disclosed techniques, each HA flow can be represented as an instance of an HA flow object, and each HA flow object for each HA flow waiting to be executed can be stored in the HA flow object database 214. As shown in FIG. 2b, the HA flow object 216 can include a plurality of fields relating to an HA flow, including a first field for an indication of an HA flow purpose 218 (e.g., to establish a connection, reset a disk, reboot a storage node), a second field for an HA flow identifier 220 (e.g., alphabetic, numeric, alphanumeric identifier), a third field for an indication of an HA flow state 222 (e.g., uninitialized, waiting to be executed, in execution, completed execution), a fourth field for an indication of an HA flow progress 224 (e.g., process flow step in execution), and a fifth field for an indication of an HA flow execution result 226 (e.g., successful or failed execution). The HA flow object 216 can further include a field for logging and statistics information 228 (e.g., certain actions taken by the framework manager 212, a timestamp taken at the start of HA flow execution).

During operation, the framework manager (e.g., the framework manager 212; see FIG. 2a) can receive, periodically or at intervals, notifications and/or reports of functional statuses of processes and/or equipment associated with the multiple storage nodes (e.g., storage nodes A 112.1, B 112.2) in the active-active storage system 104. The framework manager 212 can make determinations regarding whether and/or how to address any actual or potential process and/or equipment malfunctions (or "HA events") based on the received notifications and/or reports. For example, such HA events can occur on one or more of the storage nodes (e.g., storage nodes A 112.1, B 112.2) in the active-active storage system 104, and/or one or more shared resources in the active-active storage system 104 (e.g., disks, disks drawers, PSU hardware modules). If the framework manager 212 determines to address one or more actual or potential HA events occurring on certain processes and/or equipment associated with storage nodes in the active-active storage system 104, then the framework manager 212 can implement an HA flow for each HA event as an asynchronous process thread. Each HA flow can be represented as an instance of an HA flow object, and the HA flow object for each HA flow waiting to be executed can be stored in the persistent HA flow object database (e.g., the HA flow object database 214; see FIG. 2a). The framework manager 212 can define each HA flow at least with reference to one or more dependencies specifying its relationships with one or more other HA flows and/or certain software, firmware, and/or hardware modules or components in the active-active storage system 104. Based at least on the dependencies defining conditions for the HA flow, the framework manager 212 can determine whether to refuse a request to execute the HA flow, service the request to execute the HA flow, abort one or more HA flows in execution, and/or postpone execution of the HA flow to a later time. In this way, mutual interference of HA flows or other process threads in an active-active configuration can be reduced or eliminated, and recovery times from HA events occurring in the active-active configuration can be reduced.

The disclosed techniques for providing a centralized framework for handling execution of HA flows in an active-active storage node configuration will be further understood with reference to the following illustrative examples. In a first example, it is assumed that the framework manager 212 (see FIG. 2a) has received one or more notifications of functional statuses of processes and/or equipment associated with at least one of the storage node A 112.1 and the storage node B 112.2 in the active-active storage system 104. For example, such notifications can be sent to the framework manager 212 by a malfunction monitor (e.g., the malfunction monitor 210; see FIG. 2a) executing on the storage node A 112.1 and/or the storage node B 112.2. Such notifications can be explicit notifications of the functional statuses of processes or equipment (e.g., a disk is disconnected) and/or implicit notifications of the functional statuses of processes or equipment (e.g., a storage IO operation has failed). Further in this first example, it is assumed that the framework manager 212 has determined, based on the received notifications, that a process or equipment malfunction (or "HA event") associated with one of the storage nodes A 112.1, B 112.2 has occurred. For example, the HA event can be due to a disk malfunction, an overheated hardware component, a control malfunction, or any other suitable malfunction.

Having determined that an HA event has occurred on a process or equipment associated with one of the storage nodes A 112.1, B 112.2, the framework manager 212 implements a new HA flow for the HA event as an asynchronous process thread. In this first example, the new HA flow is defined by a set of parameters and a set of executable steps. For example, the set of parameters can include (i) zero, one, or more dependencies specifying the new HA flow's relationships with one or more other HA flows represented by HA flow objects in the persistent HA flow object database 214, (ii) an abort policy specifying rules regarding whether and/or when to abort certain HA flows in execution at the time a request to execute the new HA flow is generated, and (iii) logging and statistics information. In some embodiments, the abort policy can be priority-based or can explicitly specify which HA flows in execution to abort. It is noted that certain HA flows in execution will be aborted only if required by the abort policy. In cases where there is no need to abort or otherwise interrupt an HA flow in execution, the HA flow will not be aborted or interrupted. Further, the set of executable steps can include a set of actions to be taken by the new HA flow to address the HA event. Upon implementation of the new HA flow for the HA event, the framework manager 212 generates a request to execute the new HA flow.

In this first example, once the request to execute the new HA flow has been generated, the framework manager 212 determines, as appropriate, (i) whether the request should be immediately refused, (ii) whether any HA flows in execution should be aborted, in accordance with the abort policy, and (iii) whether execution of the new HA flow should be postponed to a later time. For example, such refusal of the request to execute the new HA flow can be based on the storage node A 112.1 or B 112.2 of interest having been taken offline or any other suitable reason. If the request is not immediately refused, then the framework manager 212 allocates an HA flow object configured to represent the new HA flow and adds the HA flow object to the HA flow object database 214. Further, the framework manager 212 checks the rules specified in the abort policy for the new HA flow and aborts zero, one, or more asynchronous process threads for HA flows in execution, as warranted by the rules. In addition, the framework manager 212 checks the dependencies of the new HA flow vis-a-vis one or more other HA flows represented by HA flow objects in the HA flow object database 214. If the HA flow dependencies dictate a certain order in which the HA flows may be executed, then the framework manager 212 can postpone the execution of the new HA flow, as necessary, to satisfy the dependencies.

Having determined that the request to execute the new HA flow should not be immediately refused, aborted zero, one, or more asynchronous process threads for HA flows in execution, and/or postponed the execution of the new HA flow as necessary to satisfy any dependencies, the framework manager 212 can determine whether any other factors exist preventing immediate execution of the new HA flow. If so, then the framework manager 212 can determine, periodically or at intervals, whether such factors preventing execution of the new HA flow continue to exist. Once it is determined that such factors no longer exist, then the framework manager 212 starts execution of the new HA flow in the asynchronous process thread.

In a second example, it is assumed that the framework manager 212 (see FIG. 2a) has received one or more additional notifications of functional statuses of processes and/or equipment associated with at least one of the storage node A 112.1 and the storage node B 112.2 in the active-active storage system 104. It is further assumed that the framework manager 212 has determined, based on the received notifications, that a process or equipment malfunction (or "HA event") has again occurred on a process or equipment associated with one of the storage nodes A 112.1, B 112.2.

Having determined that an HA event has again occurred on a process or equipment associated with one of the storage nodes A 112.1, B 112.2, the framework manager 212 implements another new HA flow for the HA event as an asynchronous process thread. As in the first example, the new HA flow of the second example is defined by a set of parameters and a set of executable steps. For example, the set of parameters can include (i) zero, one, or more dependencies specifying the new HA flow's relationships with one or more other HA flows represented by HA flow objects in the persistent HA flow object database 214, (ii) an abort policy specifying rules regarding whether and/or when to abort certain HA flows in execution at the time a request to execute the new HA flow is generated, and (iii) logging and statistics information. In this second example, however, the rules specified in the abort policy dictate that all HA flows in execution are to be aborted. Upon implementation of the new HA flow for the HA event, the framework manager 212 generates a request to execute the new HA flow.

In this second example, once the request to execute the new HA flow has been generated, the framework manager 212 determines, as appropriate, (i) whether the request should be immediately refused, (ii) whether any HA flows in execution should be aborted, in accordance with the abort policy, and (iii) whether execution of the new HA flow should be postponed to a later time. If the request is not immediately refused, then the framework manager 212 allocates an HA flow object configured to represent the new HA flow and adds the HA flow object to the HA flow object database 214. Further, the framework manager 212 checks the rules specified in the abort policy for the new HA flow and aborts all asynchronous process threads for HA flows in execution, as warranted by the rules. In addition, the framework manager 212 checks the dependencies of the new HA flow vis-a-vis one or more other HA flows represented by HA flow objects in the HA flow object database 214 and postpones the execution of the new HA flow, as necessary, to satisfy the dependencies. Moreover, for each HA flow from among the other HA flows represented by HA flow objects in the HA flow object database 214, the framework manager 212 further determines, as appropriate, (i) whether the request to execute the HA flow should be immediately refused and (ii) whether execution of the HA flow should be postponed as necessary to satisfy its dependencies. Once these further determinations are made and satisfied, the framework manager 212 starts execution of the new HA flow in the asynchronous process thread.

Figure 3:
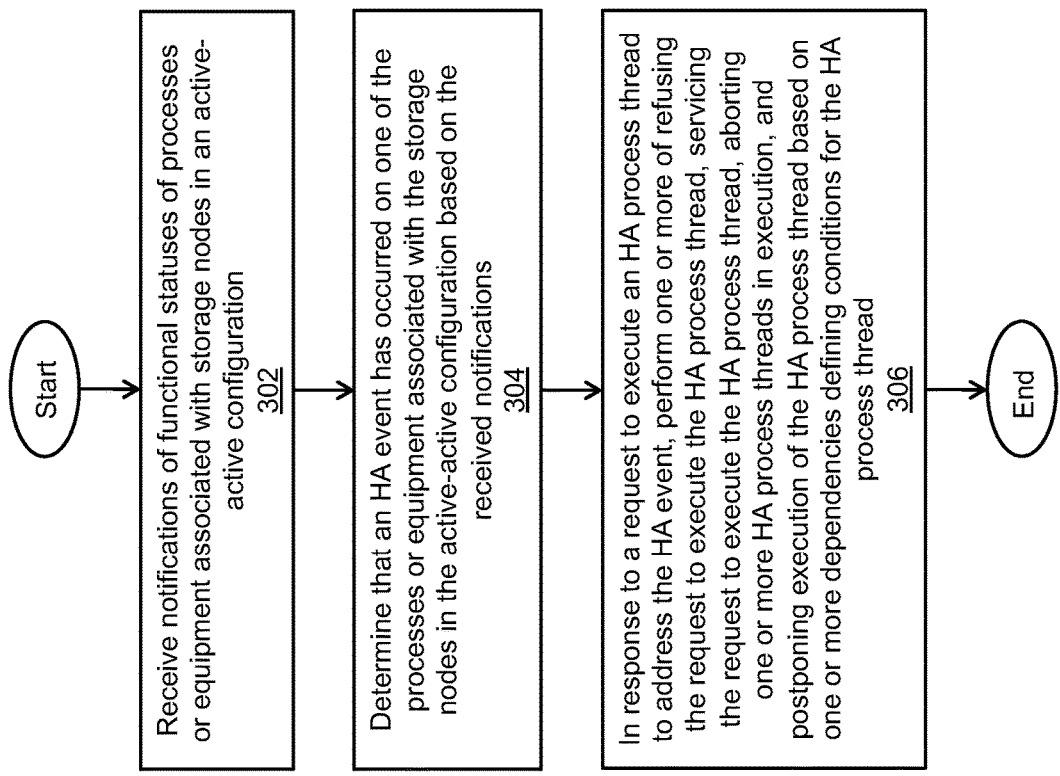
FIG. 3 is a flow diagram of an exemplary method of providing a centralized framework for handling execution of HA process flows in an active-active storage node configuration.

A method of handling execution of HA process threads in an active-active storage node configuration is described below with reference to FIG. 3. As depicted in block 302, notifications of functional statuses of processes or equipment associated with storage nodes in an active-active configuration are received. As depicted in block 304, a determination is made that an HA event has occurred on one of the processes or equipment associated with the storage nodes in the active-active configuration based on the received notifications. As depicted in block 306, in response to a request to execute an HA process thread to address the HA event, one or more of refusing the request to execute the HA process thread, servicing the request to execute the HA process thread, aborting one or more HA process threads in execution, and postponing execution of the HA process thread based on one or more dependencies defining conditions for the HA process thread, are performed.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid state drives (SSDs), flash devices (e.g., NAND flash devices, NOR flash devices), and/or similar devices that may be accessed locally and/or remotely (e.g., via a storage attached network (SAN)). A storage array (drive array, disk array) may refer to a data storage system used for block-based, file-based, or object storage. Storage arrays can include, for example, dedicated storage hardware containing HDDs, SSDs, and/or all-flash drives. A data storage entity may be a filesystem, an object storage, a virtualized device, a logical unit (LU), a logical unit number (LUN), a logical volume (LV), a logical device, a physical device, and/or a storage medium. An LU may be a logical entity provided by a storage system for accessing data from the storage system and may be used interchangeably with a logical volume. An LU or LUN may be used interchangeably with each other. A LUN may be a logical unit number for identifying an LU and may also refer to one or more virtual disks or virtual LUNs, which may correspond to one or more virtual machines. A physical storage unit may be a physical entity such as a drive or disk or an array of drives or disks for storing data in storage locations that can be accessed by addresses. A physical storage unit may be used interchangeably with a physical volume.

As employed herein, the term "storage medium" may refer to one or more storage media such as a hard drive, a combination of hard drives, flash storage, a combination of flash storage, a combination of hard drives, flash storage, and other storage devices, and/or any other suitable types or combinations of computer readable storage media. A storage medium may also refer to both physical and logical storage media, include multiple levels of virtual-to-physical mappings, and include an image or disk image. A storage medium may be computer-readable and may be referred to as a computer-readable program medium.

As employed herein, the term "IO request" or "IO" may be used to refer to an input or output request such as a data read request or data write request.

As employed herein, the terms, "such as," "for example," "e.g.," "exemplary," and variants thereof describe non-limiting embodiments and mean "serving as an example, instance, or illustration." Any embodiments described herein using such phrases and/or variants are not necessarily to be construed as preferred or more advantageous over other embodiments, and/or to exclude the incorporation of features from other embodiments. In addition, the term "optionally" is employed herein to mean that a feature or process, etc., is provided in certain embodiments and not provided in other certain embodiments. Any particular embodiment of the present disclosure may include a plurality of "optional" features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method of handling execution of high-availability (HA) process threads in an active-active storage node configuration, comprising:
receiving notifications of functional statuses of processes or equipment associated with active storage nodes in an active-active configuration, the active storage nodes including at least a first active node and a second active node;
determining that a first HA event and a second HA event have occurred on the first active node and the second active node, respectively, in the active-active configuration based on the received notifications;
defining a first HA process thread configured to address the first HA event occurring on the first active node, a second HA process thread being defined and configured to address the second HA event occurring on the second active node;
representing the first HA process thread and the second HA process thread by a first HA process thread object and a second HA process thread object, respectively, each of the first HA process thread object and the second HA process thread object including a first field indicating an HA process thread purpose and a second field indicating an HA process thread execution state, the first HA process thread being defined by a set of parameters including at least one dependency specifying a relationship between the first HA process thread and the second HA process thread as represented by the first HA process thread object and the second HA process thread object, respectively; and
in response to a request to execute the first HA process thread to address the first HA event, performing one of servicing the request to execute the first HA process thread, and postponing execution of the first HA process thread, based on the at least one dependency specifying the relationship between the first HA process thread and the second HA process thread as represented by the first HA process thread object and the second HA process thread object, respectively.

2. The method of claim 1 further comprising:
specifying a set of executable steps for the first HA process thread, the set of parameters further including an abort policy specifying rules regarding whether or when to abort at least the second HA process thread in execution.

3. The method of claim 2 wherein the second field of the second HA process thread object indicates that the HA process thread execution state of the second HA process thread is a state of being in execution, and wherein the method further comprises:
checking the specified rules in the abort policy; and
aborting the second HA process thread in execution based on the specified rules.

4. The method of claim 1 further comprising:
checking the at least one dependency specifying the relationship between the first HA process thread and the second HA process thread.

5. The method of claim 4 further comprising:
in response to the at least one dependency dictating an order in which the first HA process thread and the second HA process thread are to be executed, performing the postponing of the execution of the first HA process thread to satisfy the at least one dependency.

6. The method of claim 2 further comprising:
checking the specified rules in the abort policy; and
aborting all HA process threads in execution based on the specified rules.

7. The method of claim 1 wherein servicing the request to execute the first HA process thread includes initiating execution of the first HA process thread.

8. The method of claim 1 further comprising, in response to the request to execute the first HA process thread to address the first HA event:
allocating the first HA process thread object representing the first HA process thread; and
adding the first HA process thread object to a persistent database, the first HA process thread object being one among a plurality of HA process thread objects added to the persistent database, each of the plurality of HA process thread objects being allocated to represent a respective HA process thread.

9. The method of claim 8 further comprising:
allocating the second HA process thread object representing the second HA process thread; and
adding the second HA process thread object to the persistent database, the second HA process thread object being one among the plurality of HA process thread objects added to the persistent database.

10. The method of claim 1 wherein each of the first HA process thread object and the second HA process thread object further includes a third field indicating an HA process thread execution progress and a fourth field indicating an HA process thread execution result.

11. The method of claim 1 wherein the first field indicates the HA process thread purpose including one of establishing a connection, resetting a disk, and rebooting an active storage node from among the active storage nodes in the active-active configuration.

12. The method of claim 1 wherein the second field indicates the HA process thread execution state including one of an uninitialized state, a state of waiting to be executed, a state of being in execution, and a state of having completed execution.

13. A system for handling execution of high-availability (HA) process threads in an active-active storage node configuration, comprising:
a memory; and
processing circuitry configured to execute program instructions out of the memory to:
receive notifications of functional statuses of processes or equipment associated with active storage nodes in an active-active configuration, the active storage nodes including at least a first active node and a second active node;
determine that a first HA event and a second HA event have occurred on the first active node and the second active node, respectively, in the active-active configuration based on the received notifications
define a first HA process thread configured to address the first HA event occurring on the first active node, a second HA process thread being defined and configured to address the second HA event occurring on the second active node;
represent the first HA process thread and the second HA process thread by a first HA process thread object and a second HA process thread object, respectively, each of the first HA process thread object and the second HA process thread object including a first field indicating an HA process thread purpose and a second field indicating an HA process thread execution state, the first HA process thread being defined by a set of parameters including at least one dependency specifying a relationship between the first HA process thread and the second HA process thread as represented by the first HA process thread object and the second HA process thread object, respectively; and
in response to a request to execute the first HA process thread to address the first HA event, perform one of servicing the request to execute the first HA process thread, and postponing execution of the first HA process thread, based on the at least one dependency specifying the relationship between the first HA process thread and the second HA process thread as represented by the first HA process thread object and the second HA process thread object, respectively.

14. The system of claim 13 wherein the processing circuitry is further configured to execute the program instructions out of the memory to specify a set of executable steps for the first HA process thread, wherein the set of parameters further includes an abort policy specifying rules regarding whether or when to abort at least the second HA process thread in execution.

15. The system of claim 14 wherein the second field of the second HA process thread object indicates that the HA process thread execution state of the second HA process thread is a state of being in execution, and wherein the processing circuitry is further configured to execute the program instructions out of the memory to check the specified rules in the abort policy and abort the second HA process thread in execution based on the specified rules.

16. The system of claim 13 wherein the processing circuitry is further configured to execute the program instructions out of the memory to check the at least one dependency specifying the relationship between the first HA process thread and the second HA process thread.

17. The system of claim 16 wherein the processing circuitry is further configured to execute the program instructions out of the memory, in response to the at least one dependency dictating an order in which the first HA process thread and the other second HA process thread are to be executed, to perform the postponing of the execution of the first HA process thread to satisfy the at least one dependency.

18. The system of claim 14 wherein the processing circuitry is further configured to execute the program instructions out of the memory to:
check the specified rules in the abort policy; and
abort all HA process threads in execution based on the specified rules.

19. The system of claim 13 wherein servicing the request to execute the first HA process thread includes initiating execution of the first HA process thread.

20. A computer program product including a set of non-transitory, computer-readable media having instructions that, when executed by processing circuitry, cause the processing circuitry to perform a method of handling execution of high-availability (HA) process threads in an active-active storage node configuration, the method comprising
- receiving notifications of functional statuses of processes or equipment associated with active storage nodes in an active-active configuration, the active storage nodes including at least a first active node and a second active node;
- determining that a first HA event and a second HA event have occurred on the first active node and the second active node, respectively, in the active-active configuration based on the received notifications;
- defining a first HA process thread configured to address the first HA event occurring on the first active node, a second HA process thread being defined and configured to address the second HA event occurring on the second active node;
- representing the first HA process thread and the second HA process thread by a first HA process thread object and a second HA process thread object, respectively, each of the first HA process thread object and the second HA process thread object including a first field indicating an HA process thread purpose and a second field indicating an HA process thread execution state, the first HA process thread being defined by a set of parameters including at least one dependency specifying a relationship between the first HA process thread and the second HA process thread as represented by the first HA process thread object and the second HA process thread object, respectively; and
- in response to a request to execute the first HA process thread to address the first HA event, performing one of servicing the request to execute the first HA process thread, and postponing execution of the first HA process thread, based on the at least one dependency specifying the relationship between the first HA process thread and the second HA process thread as represented by the first HA process thread object and the second HA process thread object, respectively.

* * * * *